(12) United States Patent
Carney

(10) Patent No.: US 8,286,257 B2
(45) Date of Patent: Oct. 9, 2012

(54) ENABLING SYNCHRONOUS AND ASYNCHRONOUS COLLABORATION FOR SOFTWARE APPLICATIONS

(75) Inventor: Michael Carney, Houston, TX (US)

(73) Assignee: Schlumberger Technology Corporation, Sugar Land, TX (US)

( * ) Notice: Subject to any disclaimer, the term of this patent is extended or adjusted under 35 U.S.C. 154(b) by 479 days.

(21) Appl. No.: 12/415,220

(22) Filed: Mar. 31, 2009

(65) Prior Publication Data

US 2009/0300725 A1 Dec. 3, 2009

Related U.S. Application Data

(60) Provisional application No. 61/130,661, filed on Jun. 2, 2008.

(51) Int. Cl.
G06F 7/04 (2006.01)
G06F 15/16 (2006.01)
G06F 17/30 (2006.01)
G06F 12/00 (2006.01)
G06F 12/14 (2006.01)
G06F 13/00 (2006.01)
H04L 29/06 (2006.01)
G11C 7/00 (2006.01)
H04N 1/16 (2006.01)

(52) U.S. Cl. .................. 726/28; 726/21; 726/4

(58) Field of Classification Search .............. 726/4, 17, 726/28, 21; 709/204–205, 225, 229
See application file for complete search history.

(56) References Cited

U.S. PATENT DOCUMENTS

| 5,237,540 | A | 8/1993 | Malone | |
|---|---|---|---|---|
| 7,814,426 | B2 * | 10/2010 | Huesken et al. | 715/762 |
| 2009/0138808 | A1 * | 5/2009 | Moromisato et al. | 715/758 |

FOREIGN PATENT DOCUMENTS

| EP | 0617196 B1 | 6/2000 |
|---|---|---|
| GB | 2087177 A | 5/1981 |
| GB | 2361789 A | 10/2001 |
| WO | 03085525 A2 | 10/2003 |
| WO | 2005070128 A2 | 8/2005 |
| WO | 2006127760 A1 | 11/2006 |

OTHER PUBLICATIONS

Borah, D.K., "Smooth Phase Interpolated Modulations for nonlinear Channels", Global Telecommunications Conference, 2004, pp. 10-14, vol. 1.

* cited by examiner

Primary Examiner — Philip Chea
Assistant Examiner — Trong Nguyen
(74) Attorney, Agent, or Firm — Colin L. Wier

(57) ABSTRACT

A method for collaborating a first computer with a second computer. The method includes sending an invitation from the first computer to the second computer, and sending a list of permissions from the first computer to the second computer upon acceptance of the invitation. The list of permissions allows the second computer to access a limited portion of one or more data on the first computer. The method further includes performing an analysis on the limited portion of the data stored on the first computer by the second computer, and sending a notification from the second computer to the first computer, wherein the notification indicates that the analysis has been performed on the limited portion of the data.

14 Claims, 6 Drawing Sheets

ENABLING SYNCHRONOUS AND ASYNCHRONOUS COLLABORATION FOR SOFTWARE APPLICATIONS

RELATED APPLICATIONS

This application claims priority to U.S. provisional patent application Ser. No. 61/130,661, filed Jun. 2, 2008, titled METHOD FOR ENABLING BOTH SYNCHRONOUS AND ASYNCHRONOUS COLLABORATION FOR NEW AND EXISTING SOFTWARE APPLICATIONS, which is incorporated herein by reference.

BACKGROUND

1. Field of the Invention

Implementations of various technologies described herein generally relate to methods and tools for enabling synchronous and asynchronous collaboration to software applications and work processes.

2. Description of the Related Art

The following descriptions and examples are not admitted to be prior art by virtue of their inclusion within this section.

Numerous technical software tools can help users facilitate collaboration on various types of information. Each of these tools may invariably address either synchronous collaboration, which allows users to see and share information simultaneously, or asynchronous collaboration, which provides each user the ability to share information with each other but without the ability to evaluate the information simultaneously. In some implementations, however, these tools fail to address one or more collaboration needs of the user in various technical domains. Current collaboration environments may address high level collaboration issues by facilitating a file sharing system or an electronic communication scheme, but they may not facilitate collaboration in a technical environment because they have no means of managing the large amount of data needed to support a collaborative technical environment.

SUMMARY

Described herein are implementations of various technologies for enabling synchronous and asynchronous collaboration for software applications that builds on the current concepts of collaboration and enables users to collaborate and communicate in a technical environment while having access to collaborative tools.

In one implementation, various technologies for enabling synchronous and asynchronous collaboration may be directed to a method for collaborating a first computer with a second computer. The method includes sending an invitation from the first computer to the second computer and sending a list of permissions from the first computer to the second computer upon acceptance of the invitation. The list of permissions allows the second computer to access a limited portion of one or more data on the first computer. The method may further include performing an analysis on the limited portion of the data stored on the first computer by the second computer and sending a notification from the second computer to the first computer. The notification indicates that the analysis has been performed on the limited portion of the data.

In another implementation, various technologies for enabling synchronous and asynchronous collaboration may be directed to a collaboration system, which may include a first computer having a processor and a memory having program instructions executable by the processor to send an invitation to a second computer to perform an analysis on a limited portion of one or more data on the first computer. The second computer may include a processor and memory having program instructions executable by the processor to access a list of permissions on the first computer upon acceptance of the invitation, perform the analysis on the limited portion of the data on the first computer using a software tool stored on the second computer, and send a notification to the first computer that the analysis has been performed on the limited portion of the data. The list of permissions describes the limited portion of the data on the first computer accessible by the second computer In yet another implementation, various technologies for enabling synchronous and asynchronous collaboration may be directed to a method for collaborating with a remote computer. The method may include receiving an invitation to modify a limited portion of one or more data stored on the remote computer and accessing a list of permissions on the remote computer. The list of permissions describes the limited portion of the data accessible on the remote computer. The method may further include modifying the limited portion of the data stored on the remote computer using a software tool, storing the modified limited portion of the data on the remote computer, and sending a notification to the remote computer that the limited portion of the data has been modified.

The claimed subject matter is not limited to implementations that solve any or all of the noted disadvantages. Further, the summary section is provided to introduce a selection of concepts in a simplified form that are further described below in the detailed description section. The summary section is not intended to identify key or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

Figure 1:
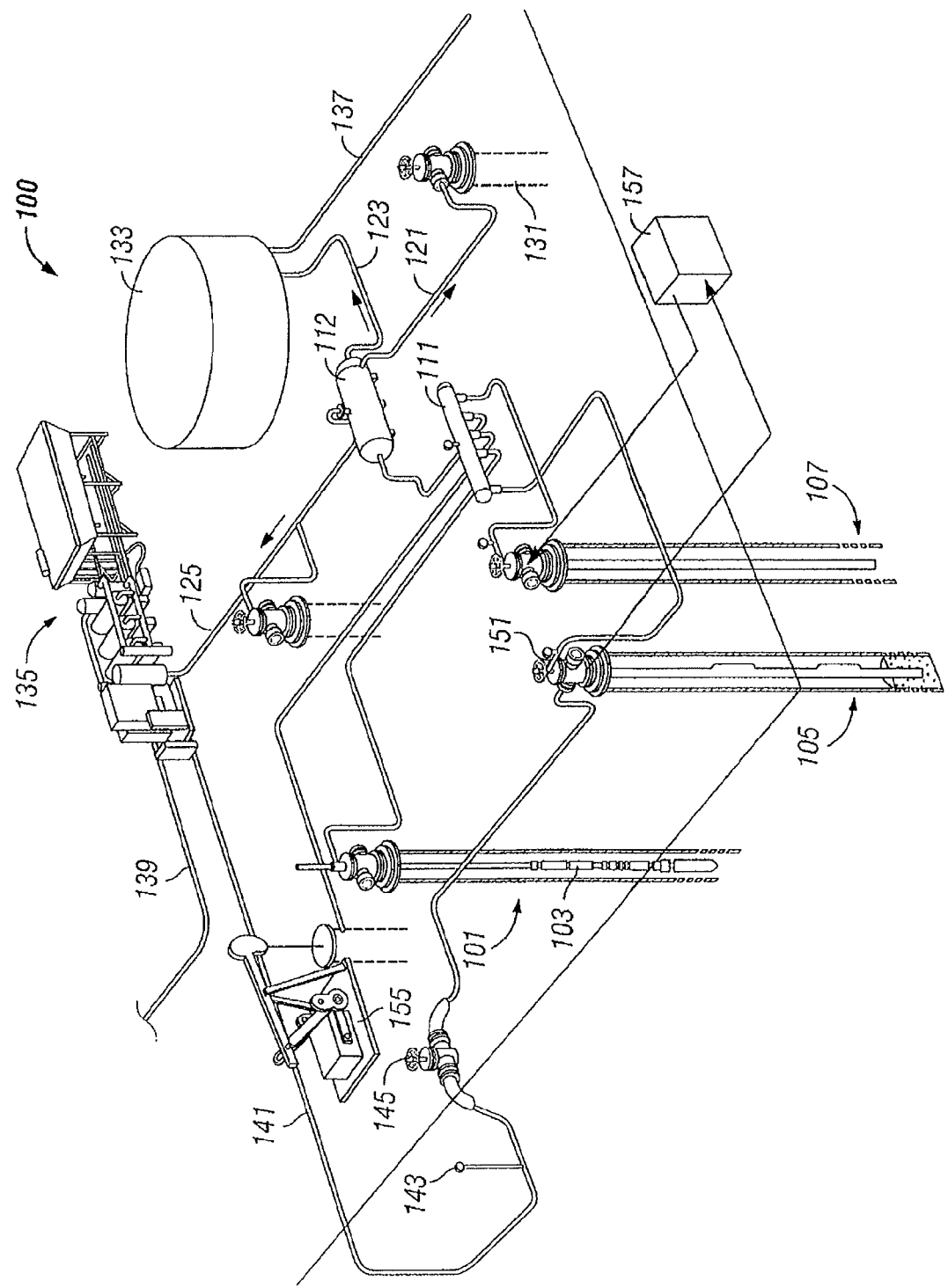
FIG. 1 illustrates a schematic diagram of an oilfield layout having a plurality of wellbores linked to an operations control center in accordance with implementations of various techniques described herein.

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraphs provide a brief description of one or more implementations of various technologies and techniques directed at enabling synchronous and asynchronous collaboration for software applications.

In the oil industry, the amount of information needed to support technical decisions can be overwhelming. Users may obtain information or data from sensors in an oil field describing certain characteristics of the oil field. The users may analyze the obtained data using specific technical tools and algorithms in order to understand the characteristics of the oil field represented by the data. In some instances, a user analyzing the obtained data may need to collaborate with another user or an expert in order to accurately interpret the data.

Various techniques described herein are directed to a method for enabling two or more users to collaborate with each other in a software environment in order to accurately analyze the obtained data. In one implementation, a user may employ a technical software application to analyze the obtained data. The technical software application may include one or more software tools to help analyze the obtained data, and it may also include a collaboration module to allow two or more users to collaborate with each other about the obtained data. As such, one user may use the collaboration module to set up a virtual workspace to create an environment in which two or more users may collaborate together. The virtual workspace includes a list of permissions that describes the location of the data that needs to be analyzed and a list of the experts who are allowed access to the data. After the virtual workspace is set up, the experts listed in the virtual workspace may receive an electronic request from the user who set up the virtual workspace for help to analyze the data listed in the virtual workspace. The experts may receive the electronic request from a technical software application stored on their own computing device.

Upon accepting the request to help analyze the data, the experts may use the technical software application's collaboration module stored on his computing device to access the virtual workspace. Upon accessing the virtual workspace, the experts may access the data listed in the virtual workspace which may be stored on the initial user's computing device (or on a server device). In this case, the experts may access the data by connecting to the user's computing device (or the server device) via a computer network; however, the virtual workspace may limit the experts' access on the user's computing device (or the server device) to the data listed in the virtual workspace. After accessing the data, the experts may analyze the data by making one or more modifications to the data (or performing one or more interpretations) using the software tools on the technical software application or using other proprietary software tools that may not be on the technical software application. After making these modifications (or interpretations), the experts may save the modified data (or new information resulting from the interpretations) directly on the user's computing device. Upon saving the modified data (or new information resulting from the interpretations), the experts may send an electronic notification to the user that the data has been modified (and/or interpreted). The experts may also provide an explanation of how the data was modified (and/or interpreted) in the notification to help the user understand how the problem with the data was solved. The software may also send a notification to the user of changes or updates to the data as a result of the modifications to the data or the interpretations.

An advantage of using the collaboration module includes allowing a technical user to involve a geographically dispersed team of people in a decision making process. The decision making process may include one or more other members of a team that may be working individually but utilizing their specific technical tools on the same data set. Here, the members may be able to work at their own pace (asynchronously) to accomplish their assigned task.

Another advantage of the collaboration module includes allowing a hydrocarbon producing company to use the help of a service company's proprietary technology. Here, the ability to share data directly with the proprietary technology may allow the service company to work either synchronously or asynchronously with the hydrocarbon producing company which may offer significant advantages in speed, accuracy, and security.

In one implementation, various techniques described herein may be used to facilitate training. For instance, a service company may have their proprietary technology embedded into a technical software application to demonstrate their proprietary technology during the course of a training exercise. The technical software application would allow the service company to attach the proprietary technology to the technical software application, connect the proprietary technology to the client's data, and perform the demonstration without having to install the proprietary technology in the client environment.

Figure 2:
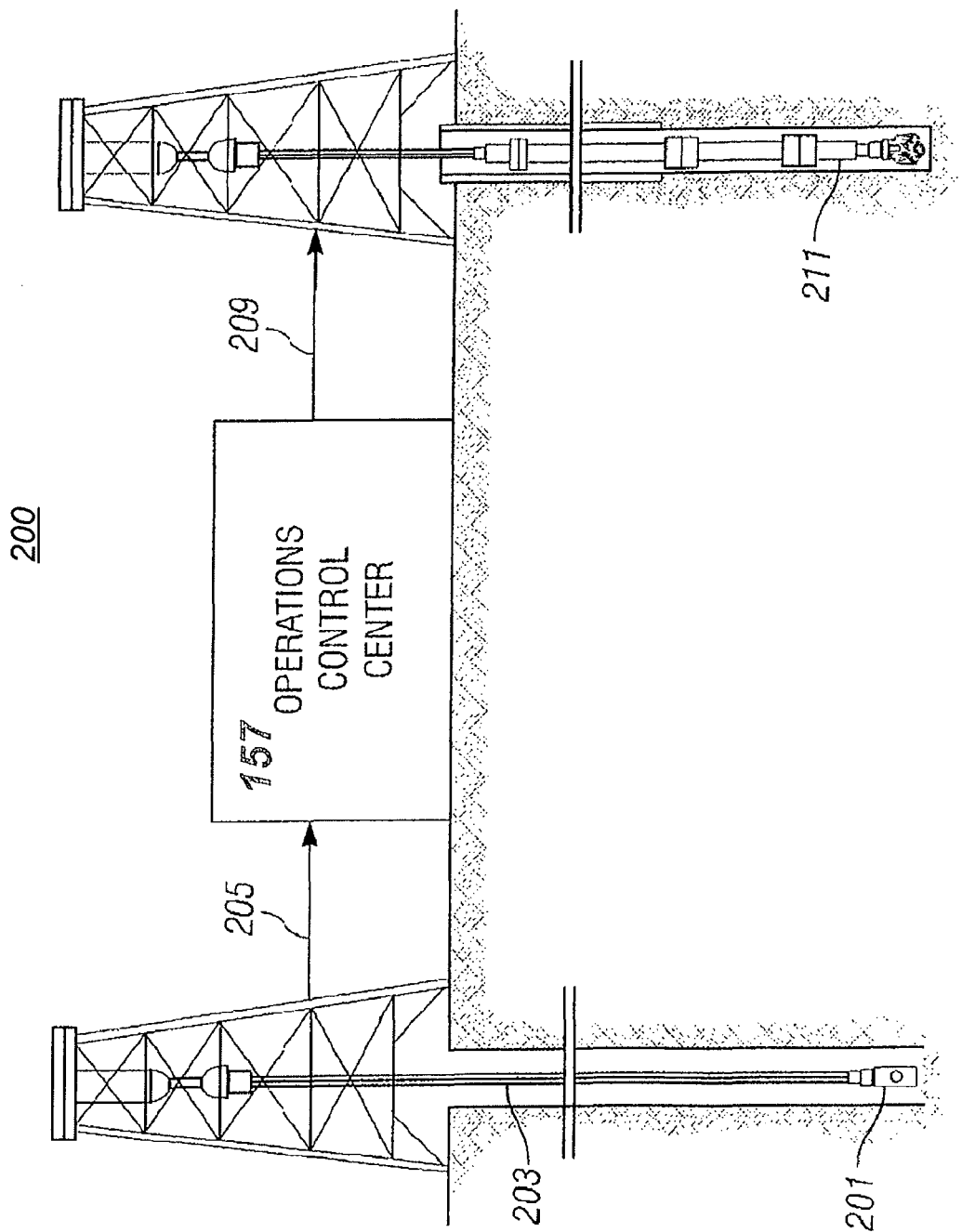
FIG. 2 illustrates a schematic diagram of two wellbores in communication with an operations control center in accordance with implementations of various techniques described herein.
Figure 3:
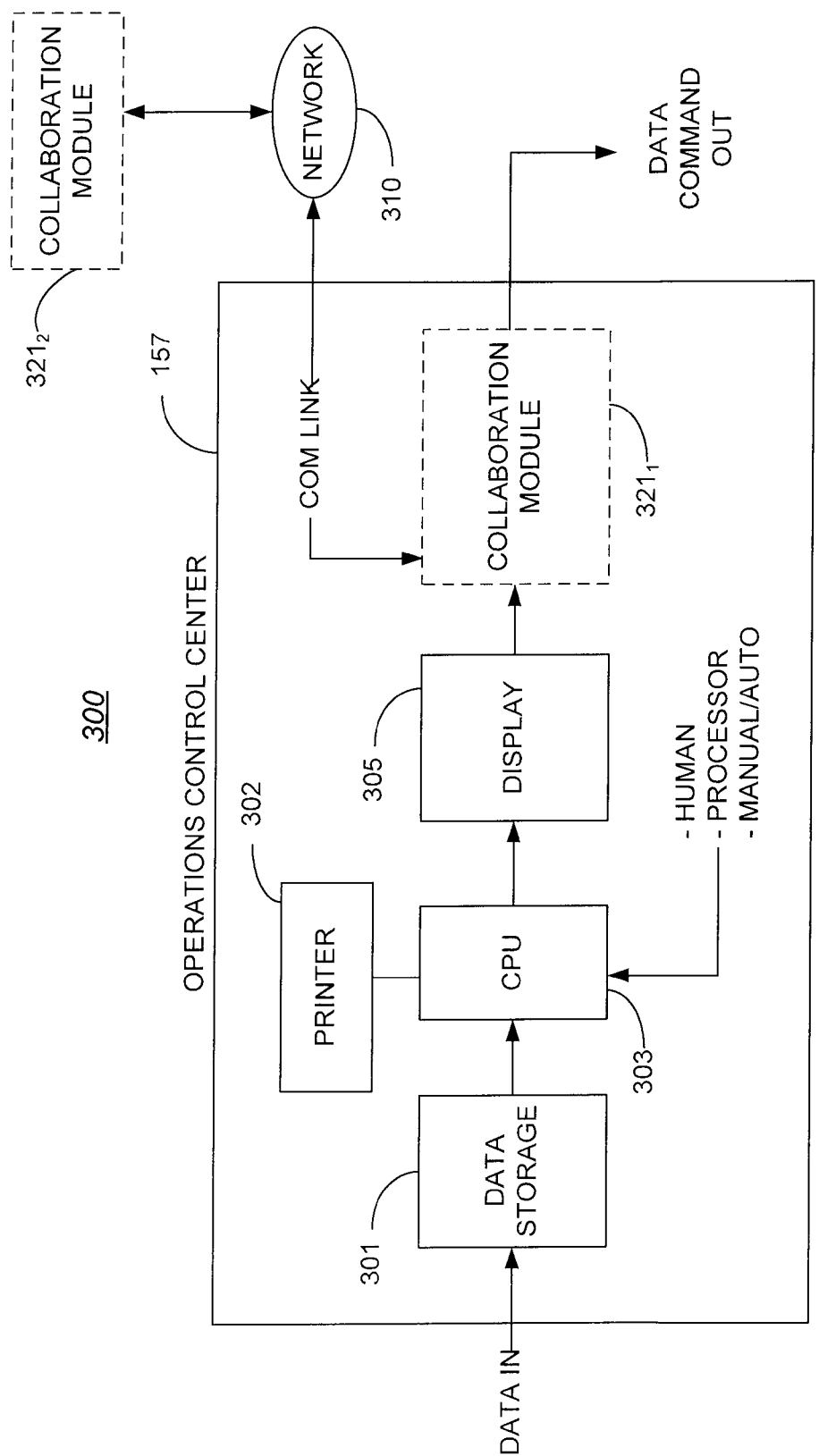
FIG. 3 illustrates a schematic diagram of an operations control center in accordance with implementations of various techniques described herein.
Figure 4:
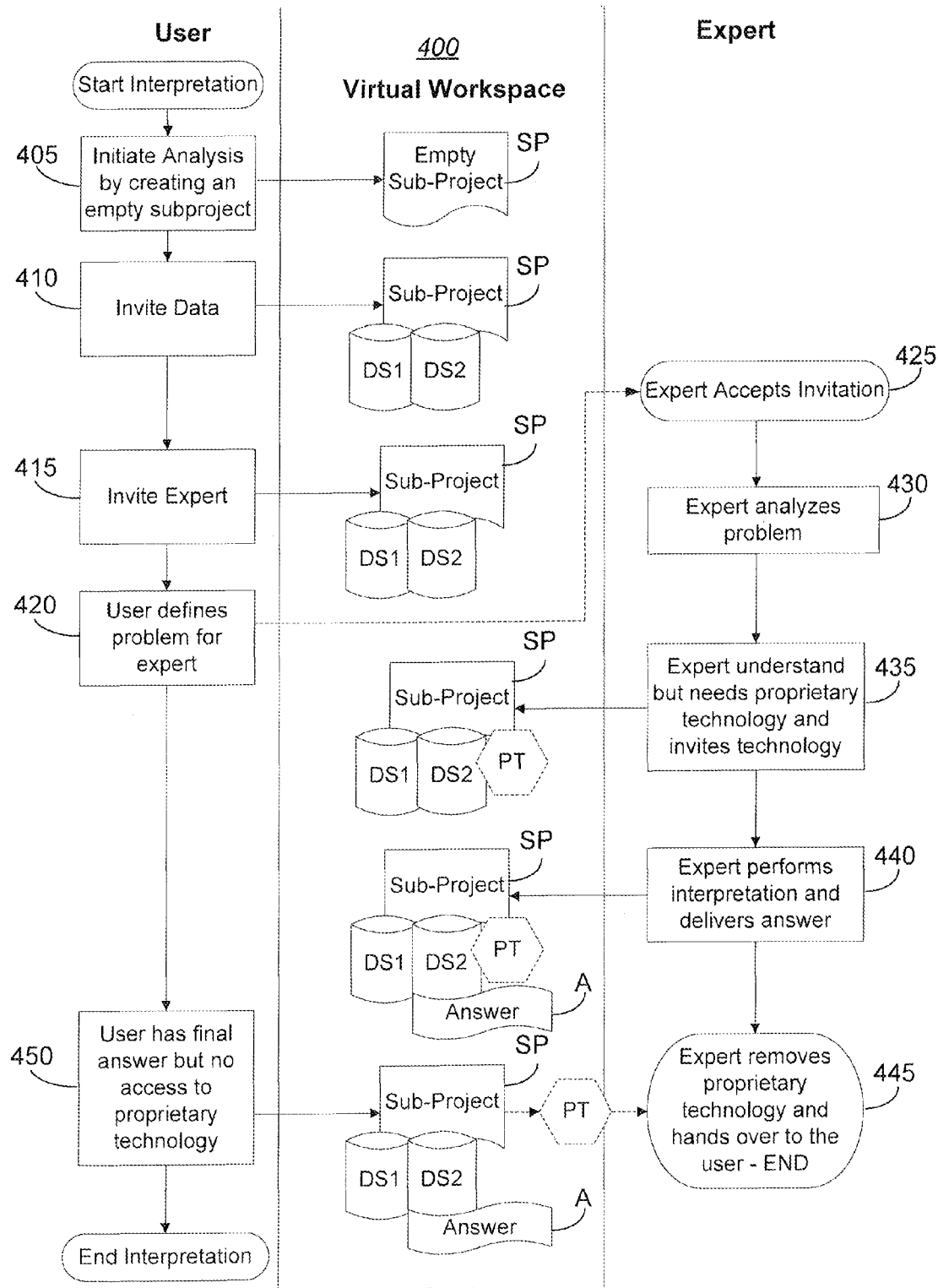
FIG. 4 illustrates a method for enabling collaboration in software applications in accordance with implementations of various techniques described herein.
Figure 5:
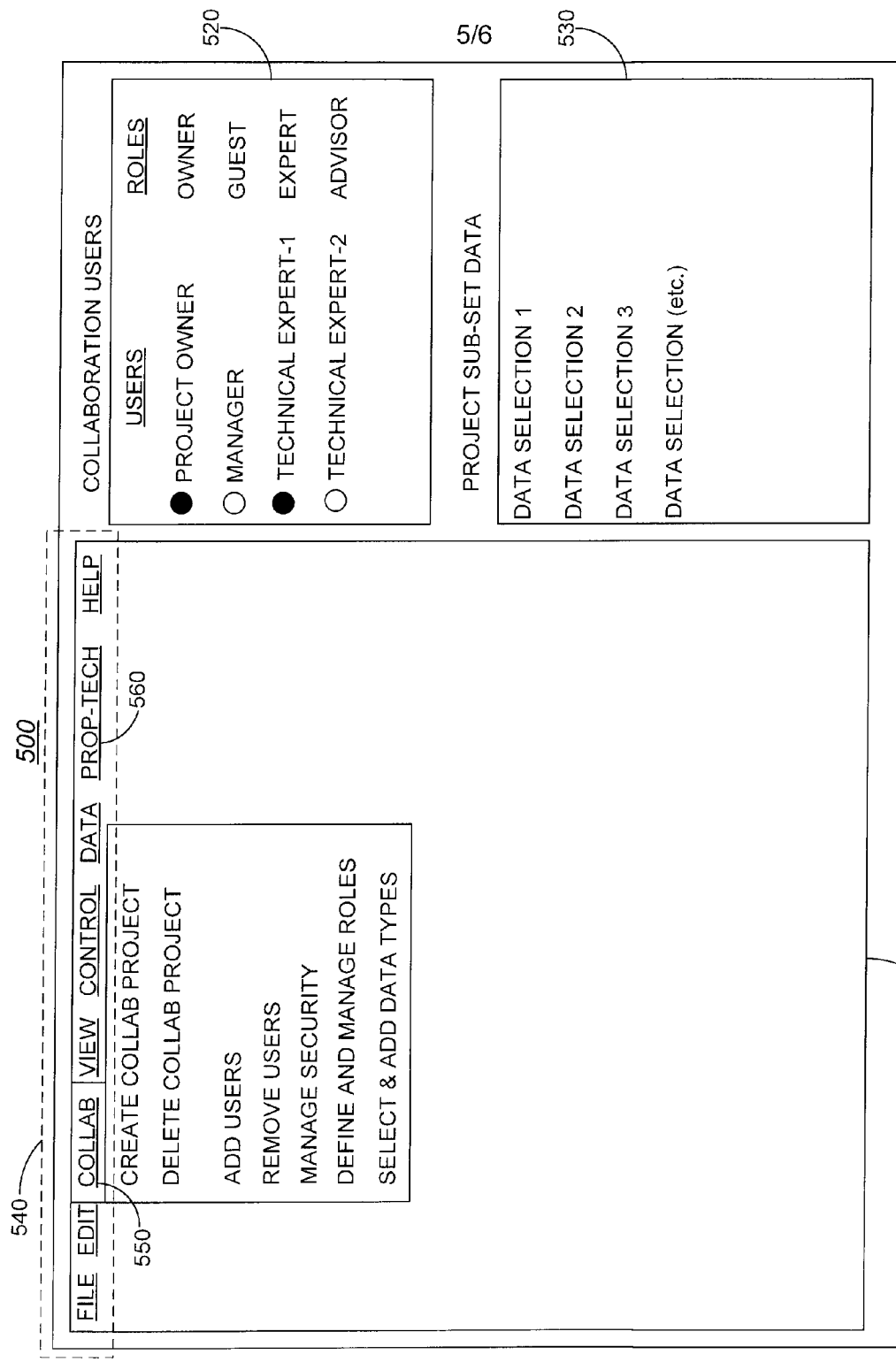
FIG. 5 illustrates a schematic diagram of a display of a software application enabled for collaboration in accordance with implementations of various techniques described herein
Figure 6:
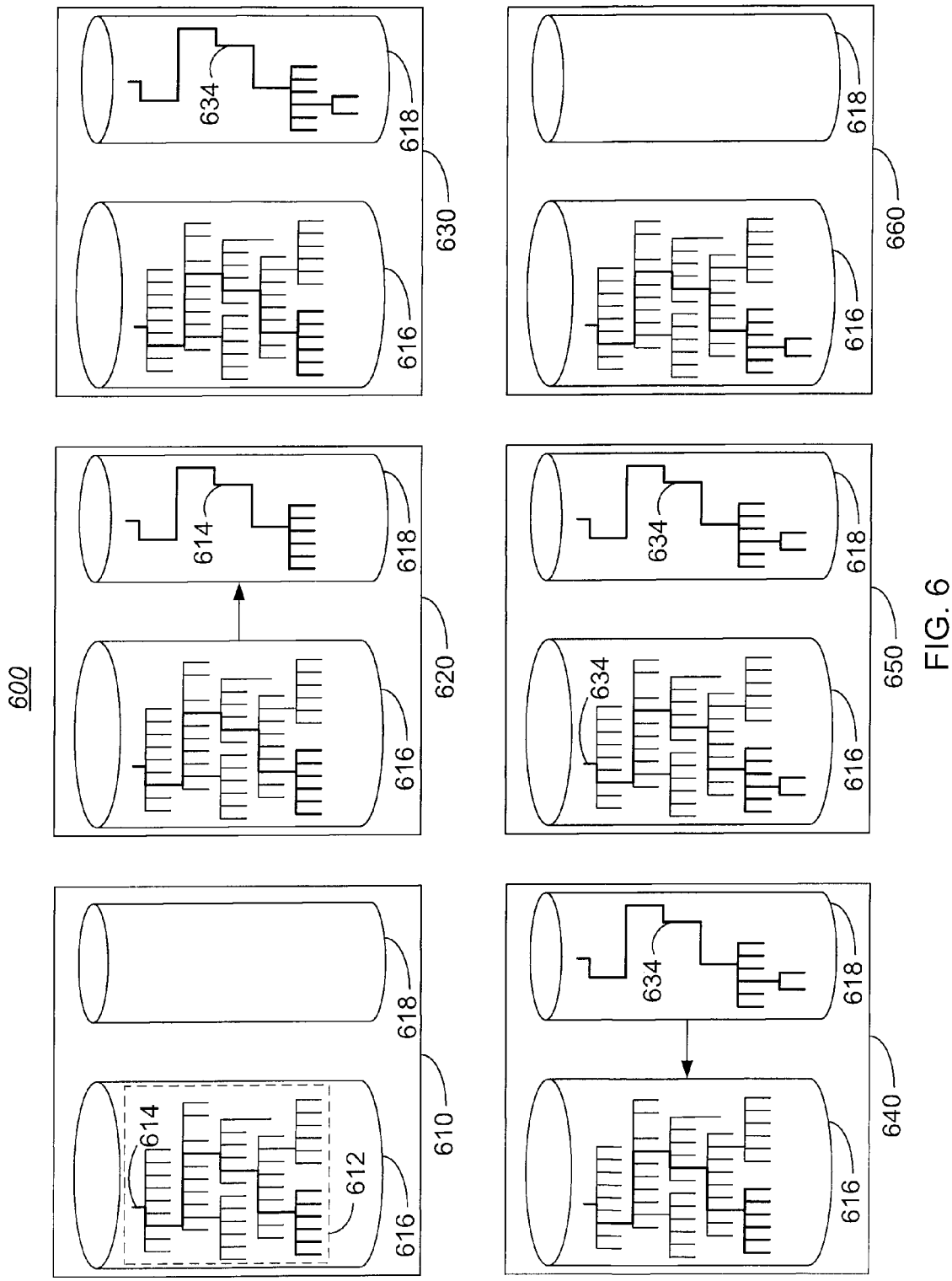
FIG. 6 illustrates a schematic diagram describing a change in a database using a collaborative software application in accordance with implementations of various techniques described herein.

FIGS. 1-3 illustrate an environment in which various techniques described herein may be implemented. FIGS. 4-6 illustrate one or more implementations of various techniques described herein in more detail.

FIG. 1 illustrates a schematic diagram of an oilfield layout 100 having a plurality of wellbores linked to an operations control center in accordance with implementations of various techniques described herein. In one implementation, a software application may be used to monitor the outputs of certain machineries or components located in the oil field layout 100. An operations control center 157 (FIG. 2) may assist in collecting data such as measurements of bottom-hole pressure and tubing head pressure from one or more components in the oil field layout 100. As shown in FIG. 1, the oil field layout 100 may include a number of wells. Specifically, the oil field layout 100 may include a first producing well 101, which may use an electric submersible pump 103 to produce a hydrocarbon (e.g., oil, gas, etc.); a second well 105, which may rely on a gas lift to produce a hydrocarbon; and a third well 107, which may produce a hydrocarbon on the basis of natural flow. In one implementation, the first producing well 101, second well 105, and third well 107 may deliver production fluids (e.g., hydrocarbon produced from their respective wells) to a production manifold 111. The production manifold 111 may collect and output multiple streams to a gas and oil separator 112.

Upon receipt of the production fluids by the gas and oil separator 112, the gas and oil separator 112 may separate produced water 121, produced oil 123, and produced gas 125 to a water disposal well 131, oil storage 133, and a compressor station 135, respectively. In one implementation, the oil storage 133 may transfer oil via an oil export pipeline 137. Similarly, the compressor station 135 may use gas export pipeline 139 to transfer gas. The compressor station 135 may process gas as an injection gas 141. In order to adjust pressure on the injection gas 141, a meter and control system 143 may cooperate with an injection-gas manifold 145. The operation of the meter and control system 143 may regulate pressure of the injection gas 141 as the injection gas 141 is delivered to a wellhead tubing and casing 151. In addition to the injection gas 141, extracting efforts may rely upon a rod pump 155 to drive a downhole pump assembly via a reciprocating motion. In such cases, the rod pump 155 may propel hydrocarbons to the production manifold 111.

In one implementation, the operations control center 157 may receive data from sensors corresponding to any well in the oil field layout 100 or surface sensors. The sensors may include, for example, a pressure sensor that measures fluid pressures at a wellhead. The operations control center 157 may also operate and/or control equipment in any wellhead. The operations control center 157 may use a data processing system including a communication unit, a processor, and a memory all of which are connected via a bus. In one implementation, the memory may be configured to store one or more sets of instructions, and the processor unit (e.g., a microprocessor) may be configured to execute one or more of the sets of instructions to control the operation of any well. Finally, the communication unit may operate as an interface between the operations control center 157 and the other oilfield operations components shown in FIG. 1. As such, the communications interface may be configured to receive data from the oilfield components and to send commands and/or data to the oilfield components.

FIG. 2 illustrates a schematic diagram of two wellbores 200 in communication with an operations control center in accordance with implementations of various techniques described herein. The following description of the two wellbores 200 is made with reference to the oilfield layout 100 of the schematic diagram described in FIG. 1 in accordance with one or more implementations of various techniques described herein. In one implementation, the two wellbores 200 may include down-hole sensors 201, well-head sensors 203, a communication link 205, a communication link 209, and a down-hole apparatus 211.

In one implementation, the down-hole sensors 201 and well-head sensors 203 may provide data (e.g., data collected and/or otherwise obtained from the down-hole sensors 201 and/or from the well-head sensors 203). Upon receipt of the data, a first communication link 205 may be used to transfer the data to the operations control center 157. The operations control center 157 may be part of the oilfield layout 100 as illustrated in FIG. 1. The operations control center 157 may store and, in some implementations, process and/or analyze the data. The operation control center 157 may also generate and transmit control signals via the second communication link 209 to a down-hole apparatus 211. In one implementation, the operation control center 157 may generate the control signals using the data obtained via the communications link 205.

In another implementation, the operation control center 157 may also provide feedback to the down-hole sensor 201 and/or the well-head sensors 203 using the data obtained via the communications link 205.

FIG. 3 illustrates a schematic diagram of an operations control center 300 in accordance with various implementations described herein. The following description of the operations control center 300 is made with reference to the operations control center 157 in the oilfield layout 100 of the schematic diagram described in FIG. 1 and the two wellbores 200 of the schematic diagram described in FIG. 2. In one implementation, the operations control center 300 may include a data storage 301, a printer 302, a central processing unit (CPU) 303, a display 305, and a collaboration module 321.

The data storage 301 may correspond to a device configured to receive and store data that may have been obtained from one or more components (e.g., down-hole sensor 201, well-head sensors 203, etc.) such as the data obtained from the sensors in the oil field layout 100 of FIG. 1 or the two wellbores 200 of FIG. 2. The data storage 301 may be implemented using a magnetic storage device, an optical storage device, a NAND storage device, or any combination thereof, etc. The CPU 303 may be configured to process data that may be stored in the data storage 301 and store the results of the processed data. In one implementation, the CPU 303 may generate commands to operate various oilfield components shown in FIG. 1 and FIG. 2 based on the processed data. Additionally, the CPU 303 may operate output devices such as the printer 302 and the display device 305 (e.g., a monitor, etc). In one implementation, the display device 305 may show templates as shown later in FIG. 5.

The collaboration module 321 may: (1) allow multiple users to work on a project and the data, irrespective of who is connected or when, thus supporting asynchronous collaboration, (2) allow a member to create a virtual workspace describing the locations of the data related to the project, (3) allow multiple members access to the sub-project without risk of contaminating or corrupting the original data or its repository, (4) allow multiple members access the data at any time or from any place to perform work on the sub-project, (5) allow members access the project sub-set based on roles and responsibilities defined by the original creator of the project data sub-set, (6) allow multiple users to access the project sub-set in the absence of other users on the basis of permissions granted based on their roles, (7) allow for a Service Delivery Mechanism to work in combination with the synchronous and asynchronous collaborative environment, and (8) allow for an Invoicing System as an extension to the Service Delivery Mechanism. In one implementation, the collaboration capability provided by the collaboration module 321 is in itself a service delivery mechanism. As such, technical experts may have access to the relevant information to perform service work using techniques, processes, and proprietary technology to deliver answers and solutions to client problems in a timely manner without the need to displace people or data. The Invoicing system may be linked to the collaboration module 321 to account for time worked and/or linked to a service delivery contract with each specific client. In addition to accounting for the time, the Invoicing system may also contain information about cost per service and time which would then allow for invoice accounting to be performed.

In one implementation, the operations control center 300 may operate in a networked environment using logical connections to one or more remote computers via a network 310. The logical connections may include any connection that is commonplace in offices, enterprise-wide computer networks, intranets, and the Internet, such as local area network (LAN) and a wide area network (WAN). The network 310 may enable two or more remote computers to connect with each other providing access to data stored on each computer. For example, the collaboration module $321_1$ stored on a first computer may connect with another collaboration module $321_2$ that may be stored on a different computer via the network 310 in order to collaborate on the data stored on the data storage 301. When accessing the network 310, the collaboration module $321_2$ may use a modem, a wireless router or other means for establishing communication over the network 310, such as the Internet.

FIG. 4 illustrates a data flow diagram 400 for enabling synchronous and asynchronous collaboration of data in software applications in accordance with various implementations described herein. The following description of the data flow diagram 400 is made with reference to the operations control center 300 of the schematic diagram described in FIG. 3. In one implementation, the data flow diagram 400 may be executed by the collaboration module 321$_1$.

The collaboration module 321$_1$ may be accessed by a technical software application used to perform one or more analytical tasks related to the data obtained from the oilfield layout 100 or other similar environments. In one implementation, a user may have a problem in analyzing the data (e.g., obtained from the oilfield layout) such that he may wish to seek help from an expert. As such, the user may seek help through the collaboration module 321$_1$ that connects the user with one or more experts via a virtual workspace. The collaboration module 321$_1$ may be pre-installed on the technical software application such that it may be accessed on the technical software application from a menu bar as illustrated later in FIG. 5. The user who is seeking help with his problem may use the collaboration module 321$_1$ to collaborate with an expert. In one implementation, the collaboration module 321$_1$ may exist on the user's computing device.

At step 405, the collaboration module 321$_1$ may receive a request to initiate a collaboration project by the user. The collaboration project may be used to enable the user to collaborate with one or more experts in order to solve the related problem. In response to this request, the collaboration module 321$_1$ may create a sub-project SP in order to enable the user to collaborate with other users or experts on an issue related to the obtained data specific to the sub-project SP. In one implementation, the sub-project SP may be a virtual workspace that may allow the user and one or more experts to work with each other and share data available in the sub-project SP without having to be located in the same geographical location. For example, the user and the experts working together in a virtual workspace may have access to the sub-project SP through the Internet, Intranet, or the like. The sub-project SP may include a list of permissions that may define the rights that each expert may have with respect to the sub-project SP. For example, the list of permissions may indicate what data each expert may have access to. In one implementation, the sub-project SP may exist on a computer network (i.e., server, personal computer, etc.) such that experts may have access to the sub-project SP via a computer. Initially, the sub-project SP may be empty or may not contain a list of permissions.

At step 410, the collaboration module 321$_1$ may receive a request from the user to add or invite data into the sub-project SP. In one implementation, the user may specify the data that may be related to the problem that the user is seeking help in solving. For instance, data (DS1 and DS2) may be selected by the user to be added to the sub-project SP. In one implementation, when adding data DS1 and data DS2 to the sub-project SP, the collaboration module 321$_1$ may alter the permission list of the sub-project SP such that the users with access to the sub-project SP may also have access to the data DS1 and the data DS2. In one implementation, the data DS1 and the data DS2 may be stored on the user's computing device, but in other implementations the data DS1 and the data DS2 may be stored on a server that may also be connected to the network 310.

At step 415, the collaboration module 321$_1$ may receive a request from the user to add or invite one or more experts into the sub-project SP. In one implementation, the user may specify one or more experts that he/she may desire to collaborate with to the collaboration module 321$_1$.

At step 420, the collaboration module 321$_1$ may receive a description of the problem in which the user needs help to solve. Upon receiving the information related to the invited experts and the problem description, the collaboration module 321$_1$ may send a message to each of the invited experts which may include an invitation to collaborate with the user using the sub-project SP. The message may also include the description of the problem as received at step 420. In one implementation, the message may be in the form of an e-mail or another similar electronic format.

In one implementation, the preceding steps 405-420 and the proceeding step 450 may be performed on the user's computing device using the collaboration module 321$_1$. However, the following steps 425-445 may be performed on the computing device of the expert who accepted the invitation to the sub-project SP. As such, the expert may use the collaboration module 321$_2$ which may be stored on his computing device to access the sub-project SP. In other implementations, however, steps 405-440 may all be performed on the same computing device by the user and the invited expert.

At step 425, one or more of the invited experts may accept the user's invitation to collaborate on the sub-project SP (collaborating expert). In accepting the collaboration invitation, the collaborating expert may use the collaboration module 321$_2$ of the technical software application stored on his computing device to send a signal to the collaboration module 321$_1$ indicating that the collaborating expert accepted the user's invitation.

At step 430, the collaborating expert may open or initialize the same technical software application that the user may be using on his own computing device in order to access the sub-project SP and evaluate the user's problem. When accessing the sub-project SP, the collaboration module 321$_2$ may use the sub-project's SP permission list to determine the collaborating expert's rights on the sub-project SP. If the collaborating expert has the authority to access the data DS1/DS2, he may perform functions and analysis directly on the data DS1/DS2 using the tools provided in the technical software application.

Although the collaborating expert's technical software application may be similar to the technical software application of the user, in some implementations, the collaborating expert's version of the technical software application may include one or more additional features or capabilities that the user's version may not include. The additional features may include integrating one or more other proprietary technologies into the technical software application.

At step 435, after analyzing the problem, the collaborating expert may determine that a different software application, or proprietary technology PT, may be helpful in analyzing or solving the problem. Here, the collaboration module 321$_2$ may receive a request from the collaboration expert to invite a proprietary technology PT to the sub-project SP. The proprietary technology PT may be a software application that may be used to perform additional analysis on the data obtained from the oilfield layout 100. Upon inviting the proprietary technology PT to the sub-project SP, only the collaborating expert may have access to the proprietary technology PT.

This proprietary technology PT may take many forms but it will typically be some specific analysis technique, workflow, or an algorithm that may give the collaborating expert some competitive advantage. By allowing the collaborating expert to use the proprietary technology PT in the sub-project SP, the accuracy and reliability of the results may be enhanced because the proprietary technology PT may be capable of performing additional analytical tasks to the data DS1/DS2 that the user's or the experts' technical software application may not be capable of performing.

At step 440, the collaborating expert may perform analysis on the data DS1/DS2 in order to try and solve the user's problem. In one implementation, the collaborating expert may solve the problem using the tools provided in the technical software application without the use of the proprietary technology PT. As such, upon solving the problem, the collaborating expert may make one or more alterations to the data DS1/DS2 to correct the problem. The alterations to the data DS1/DS2 may include filtering, de-spiking, or cleansing of the data DS1/DS2 that may have been associated with the problem. In one implementation, the alterations to the data DS1/DS2 may be stored on the user's computing device. A record of the alterations performed to the data DS1/DS2 may be listed in an answer A that may be attached to the sub-project SP. The answer A may increase the user's ability to understand how the problem is solved as opposed to just receiving an answer because the answer A may indicate to the user how the collaborating expert solved the user's problem. Without this capability, many users may not have much confidence in the results because the users may not understand how the altered data was obtained or whether the data was even accurate.

After solving the problem and attaching the answer A to the sub-project SP, the collaborating user may use the collaboration module $321_2$ to send a message to the user as described later in step 445.

As briefly mentioned above, the collaborating expert may use the proprietary technology PT to solve the problem. Here, the collaborating expert may analyze the data DS1/DS2 with the proprietary technology PT because the problem may not be solved using the tools of the technical software application. Using the proprietary technology PT, the collaborating expert may alter the data DS1/DS2 and store the altered data on the user's computing device. A list of the alterations performed to the data DS1/DS2 by the proprietary technology PT may also be stored in the answer A that may be attached to the sub-project SP.

In one implementation, the data DS1/DS2 stored on the user's computing device may not be altered. As such, alterations to the data DS1/DS2 may be stored as a different version of the data DS1/DS2. For instance, any iterations and/or alterations performed on the data DS1/DS2 may be stored in the answer A to indicate what modifications were performed and which collaborating expert performed each modification. This information may be used to create an audit trail that allows any user to review and understand the solution to the problem. In this instance, the collaboration module $321_1$ may allow multiple experts to collaborate with the user and access the data DS1/DS2. As such, each collaborating expert may work on the data DS1/DS2 and save his work on a different version of the data DS1/DS2 thereby eliminating the need for a file sharing scheme.

At step 445, the collaborating expert may use the collaboration module $321_2$ to send a message to the user that the problem has been solved. In one implementation, if the collaborating expert used the proprietary technology PT in solving the problem, he may remove the proprietary technology PT from the sub-project SP prior to sending the message.

At step 450, the user may use the collaboration module $321_1$ to access the sub-project SP. Here, the user may examine the answer A which may explain how the collaborating expert may have solved the problem. In one implementation, the answer A may indicate what changes were made to the data DS1/DS2 in order to solve the problem. The data DS1/DS2 stored on the computing device of the user may include the changes performed by the collaborating expert.

FIG. 5 illustrates a schematic diagram of a display of a software application enabled for synchronous and asynchronous collaboration in accordance with various implementations described herein. In one implementation, the display 500 may illustrate a user interface of a technical software application that has a collaboration module and proprietary technology embedded within.

In one implementation, the display 500 may include three main sections: EXISTING TECHNICAL SOFTWARE APPLICATION (510), COLLABORATION USERS (520), and PROJECT SUB-SET DATA (530). The EXISTING TECHNICAL SOFTWARE APPLICATION 510 may include the original technical software application as employed by the user at step 405 with all the pre-existing functionalities that was part of its' original programming. The COLLABORATION USERS 520 and the PROJECT SUB-SET DATA 530 may include additional integrated functionalities to enable collaboration, such as shown below.

COLLABORATION USERS 520:
  The ability to add users
  The ability to detect presence
  The ability to define roles PROJECT SUB-SET DATA 530:
  The ability to add data to the project
  The ability to remove data
  The ability to restrict/control access to data based on roles In one implementation, the COLLABORATION USERS 520 feature may allow a project owner to invite one or more members of the workspace that may have an interest in the project into the project space (sub-project SP). The members may include managers, colleagues, technical experts, helpers, etc. While the project owner invites members, he may also have the ability to assign roles and responsibilities to each member. The roles and responsibilities for each member may vary from one technical application to the next, but they may define the right of the invited members to view, add, append, change, and delete data or information from the project. In one implementation, the roles may be labeled with names such as OWNER, GUEST, EXPERT, etc. In another implementation, the video display 500 may include the ability to detect the presence of one or more members who may be currently accessing the technical software application. For example, in FIG. 5 under the COLLABORATION USERS 520, both the PROJECT OWNER and the TECHNICAL EXPERT-1 are indicated as being online because the dot by their respective title is solid, while the MANAGER and the TECHNICAL EXPERT-2 are offline as indicated by the corresponding open dot next to their titles.

Another feature of the video display 500 may include the menu structure 540. The menu structure 540 may include the options provided in the original technical software application. In one implementation, the menu structure 540 may also include one or more additional menu items as compared to the original technical software application in order to integrate one or more collaboration features into the technical software application. For example, the menu structure 540 may include a COLLAB menu item 550 and a PROP-TECH menu item 560.

In one implementation, the COLLAB menu item 550 may include commands to manage the collaboration features of the technical software application which may include commands to CREATE A COLLABORATION PROJECT, DELETE A COLLABORATION PROJECT, ADD USERS, REMOVE USERS, and DEFINE AND MANAGE ROLES. Furthermore, a command to MANAGE SECURITY may also be included to allow users to control when and how experts may access data. The managing security feature may allow an owner to restrict access to a user such that they can only work on a project when both the owner and the invited user are both looking at the project at the same time. In one implementation, the managing security feature may manage and control whether an invited user could work synchronously and/or asynchronously. Finally, the owner may manage the data types that are visible within the project using a SELECT & ADD DATA TYPES option.

The PROP-TECH menu item 560 may illustrate how proprietary technology may be integrated into the technical software application. Although in this implementation, a menu item added to the technical software application may be labeled PROP-TECH, it should be noted that another name may be used instead of PROP-TECH. The PROP-TECH 560 menu item may be introduced or integrated into the technical software application by any member who may be invited into the project space. The PROP-TECH 560 menu item may be managed by the member that introduces it into the project space. In one implementation, the owner of the proprietary technology may manage access and visibility within the confines of the PROP-TECH menu item 560. In another implementation, the PROP-TECH menu item 560 may include an algorithm or technology that may be applied to the technical software application or to data contained within the project.

In one implementation, the algorithm of the PROP-TECH menu item 560 may correct environmental effects of an open hole logging tool measurement. For example, a service company may perform a logging service for a client and deliver a graphical representation of information about a well, but the information may need to be corrected due to one or more environmental factors of the well. In this case, the algorithm that is developed by the service company to perform these corrections may serve as proprietary technology. These types of corrections may be done several times because an oil company may then come back to the service company to validate the assumptions. Therefore, the ability to add proprietary technology may significantly enhance the ability of a service company to provide service. When used in conjunction with the collaboration technology, there may be a significant value in the time to deliver results and the ability to minimize errors.

FIG. 6 illustrates a schematic diagram 600 describing a change in a database within a collaborative software application in accordance with various implementations described herein. The following description of the schematic diagram 600 is made with reference to the data flow diagram described in FIG. 4. In one implementation, step 610 through step 650 may illustrate a sequence of steps that may indicate how data 612 may be moved from an original database 616 to a sub-project 618 and how the results may be subsequently transferred back to the original database 616. In this illustration, the sub-project 618 may be a real database instance or a virtual instance. In one implementation, the sub-project 618 may correspond to the description of the sub-project SP of FIG. 4.

At step 610, the original database 616 may include data 612. In this illustration, data 612 may be arranged in a hierarchal structure to illustrate the plurality of data options that may be available to a user. In one implementation, the data that may be selected by the user at step 410 may be indicated by the data line 614. In one implementation, the data 612 may be held in more than one database. Therefore, it should be noted that for the purposes of this discussion, the original database 616 may represent the collection of data 612 that may be stored in one or more databases.

In one implementation, when a user performs an analysis on the data line 614 while it is stored on the original database 616, other experts may also have access to the data line 614 in the original database 616 such that the user and the experts may all be performing a different type of analysis on the same data line 614. In order to avoid this problem, a user may create a sub-project 618.

At step 620, the user may connect the sub-project 618 to the original database 612 and copy the selected data line 614 into the sub-project 618. The sub-project 618 may be real or virtual and may be used to store the data line 614 so that modifications may be made to the data in the data line 614. The virtual sub-project 618 may correspond to the description of the sub-project SP of FIG. 4. In one implementation, the real sub-project SP would be used as a work area allowing the user(s) and or the technical expert(s) to perform analysis on the data set within the sub-project 618 without fear of corrupting the original data because a copy of the original data may be stored on a local machine. As such, the users may have the luxury of performing what-if exercises, trying different techniques, using multiple processes all in order to determine the best possible outcome.

At step 630, the connection or link between the original database 616 and the sub-project 618 may be broken. In one implementation, step 630 may be where the discussion becomes relevant to collaboration. In a collaborative environment, the user and the experts may all have access to the sub-project 618 based on their respective roles as described in FIG. 5. In one implementation, each expert may be isolated from the original database 616 which may thereby reduce the risk of contaminating or corrupting the original data 612. By putting only the relevant data in the sub-project 618, the experts may have the ability to work on an original version. At step 630, the data line 614 may be changed or altered by one or more experts who may be working to resolve the problem as described at step 425 in FIG. 4. The modification of the data line 614 is illustrated with the addition two lines at the base of the original hierarchy of the original data 612. In one implementation, the resolved problem may be represented by the modified data line 634.

Although step 630 has been described as breaking the connection or link between the original database 616 and the sub-project 618, it should be noted that the line between the original database 616 and the sub-project 618 in step 620 may illustrate synchronous collaboration, and the missing line at step 630 may illustrate asynchronous collaboration.

At step 640, the expert who modified the data line 614 may synchronize the modified data line 634 with the data 612 in the original database 612. The expert may therefore reconnect the sub-project 618 with the original database 616.

At step 650, the modified data line 634 may be moved to the original database 616. After modified data line 634 is moved into the original database 616, the original database 616 and the sub-project 618 may be disconnected.

At step 660, the user may delete the modified data line 634 from the sub-project 618. In one implementation, the sub-project 618 may be a temporary data-set that may exist while the problem is being analyzed. As a result, the integrity and security of the original database 616 may be adequately managed because all the members involved in the collaboration may only have access to the sub-project 618.

While the foregoing is directed to implementations of various technologies described herein, other and further implementations may be devised without departing from the basic scope thereof, which may be determined by the claims that follow. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for collaborating a first computer with a second computer, comprising:
   creating a virtual workspace for a first user of the first computer;
   inviting a limited portion of one or more data on the first computer into the virtual workspace, wherein the limited portion of the data includes data collected from at least one wellbore in an oil field for a client;
   sending an invitation from the first computer to the second computer to invite a second user of the second computer into the virtual workspace;
   sending a list of permissions from the first computer to the second computer upon acceptance of the invitation, wherein the list of permissions allows the second computer to access the limited portion of the data on the first computer;
   inviting a proprietary technology software tool into the virtual workspace for use by the second user when performing an analysis on the limited portion of the data stored on the first computer, wherein the proprietary technology software tool includes an algorithm proprietary to a service company and configured to correct the collected data for environmental effects, wherein the algorithm is accessible to the service company and inaccessible to the client while the proprietary technology software tool is invited into the virtual workspace, and wherein the proprietary technology software tool is inaccessible by the first user while the proprietary technology software tool is invited into the virtual workspace;
   performing the analysis on the limited portion of the data stored on the first computer by the second computer using the proprietary technology software tool while the proprietary technology software tool is invited into the virtual workspace and inaccessible by the first user; and
   sending a notification from the second computer to the first computer, wherein the notification indicates that the analysis has been performed on the limited portion of the data, wherein each of the first and second computers includes a technical software application with a collaboration module incorporated therein, and wherein the proprietary technology software tool is integrated into the technical software application on the second computer.

2. The method of claim 1, further comprising removing the proprietary technology software tool from the virtual workspace prior to sending the notification from the second computer to the first computer.

3. The method of claim 1, wherein the notification describes one or more changes made to the limited portion of the data.

4. The method of claim 1, wherein the analysis is synchronously performed by the second computer and the first computer.

5. The method of claim 1, wherein the analysis is asynchronously performed by the second computer without any input from the first computer.

6. The method of claim 1, wherein performing the analysis comprises creating and storing, by the second computer, a revised version of the limited portion of the data stored on the first computer.

7. The method of claim 1, further comprising displaying a list of users that are allowed to access the limited portion of the data through the list of permissions.

8. A collaboration system, comprising:
   a first computer having a first processor and a first memory having program instructions executable by the first processor to:
      create a virtual workspace for a first user of the first computer;
      invite a limited portion of one or more data on the first computer into the virtual workspaces, wherein the limited portion of the data includes data collected from at least one wellbore in an oil field for a client;
      send an invitation to a second computer to invite a second user of the second computer into the virtual workspace;
   wherein the second computer comprises a second processor and a second memory having program instructions executable by the second processor to:
      access a list of permissions on the first computer upon acceptance of the invitation, wherein the list of permissions describes the limited portion of the data on the first computer accessible by the second computer;
      invite a proprietary technology software tool into the virtual workspace for use by the second user when performing an analysis on the limited portion of the data stored on the first computer, wherein the proprietary technology software tool includes an algorithm proprietary to a service company and configured to correct the collected data for environmental effects, wherein the algorithm is accessible to the service company and inaccessible to the client while the proprietary technology software tool is invited into the virtual workspace, and wherein the proprietary technology software tool is inaccessible by the first user while the proprietary technology software tool is invited into the virtual workspace;
      perform the analysis on the limited portion of the data on the first computer using a software tool stored on the second computer using the proprietary technology software tool while the proprietary technology software tool is invited into the virtual workspace and inaccessible by the first user; and
      send a notification to the first computer that the analysis has been performed on the limited portion of the data, wherein each of the first and second computers includes a technical software application with a collaboration module incorporated therein, and wherein the proprietary technology software tool is integrated into the technical software application on the second computer.

9. The collaboration system of claim 8, wherein the second computer is further configured to remove the proprietary technology software tool from the virtual workspace prior to sending the notification from the second computer to the first computer.

10. The collaboration system of claim 8, wherein the program instructions executable by the second processor to perform the analysis comprises program instructions executable by the second processor to create and store a revised version of the limited portion of the data stored on the first computer.

11. The collaboration system of claim 8, wherein the analysis is synchronously performed by the second computer and the first computer.

12. The collaboration system of claim 8, wherein the analysis is asynchronously performed by the second computer without any input from the first computer.

13. A method for collaborating with a remote computer, comprising:

receiving an invitation to modify a limited portion of one or more data stored on the remote computer, wherein the limited portion of the data includes data collected from at least one wellbore in an oil field for a client, wherein the limited portion of the data on the remote computer is invited into a virtual workspace created for a first user of the remote computer, and wherein the invitation invites a second user of a second computer into the virtual workspace;

accessing a list of permissions on the remote computer, wherein the list of permissions describes the limited portion of the data accessible on the remote computer;

inviting a proprietary technology software tool into the virtual workspace for use by the second user when modifying the limited portion of the data, wherein the proprietary technology software tool includes an algorithm proprietary to a service company and configured to correct the collected data for environmental effects, wherein the algorithm is accessible to the service company and inaccessible to the client while the proprietary technology software tool is invited into the virtual workspace, and wherein the proprietary technology software tool is inaccessible by the first user while the proprietary technology software tool is invited into the virtual workspace;

modifying the limited portion of the data stored on the remote computer using the proprietary technology software tool while the proprietary technology software tool is invited into the virtual workspace and inaccessible by the first user, wherein modifying the limited portion of the data is performed by the second computer, wherein each of the remote and second computers includes a technical software application with a collaboration module incorporated therein, and wherein the proprietary technology software tool is integrated into the technical software application on the second computer;

storing the modified limited portion of the data on the remote computer; and sending a notification to the remote computer that the limited portion of the data has been modified.

14. The method of claim 13, further comprising removing the proprietary technology software tool from the virtual workspace prior to sending the notification to the remote computer.

\* \* \* \* \*